(12) United States Patent
Iimori et al.

(10) Patent No.: US 8,155,344 B2
(45) Date of Patent: Apr. 10, 2012

(54) VEHICLE SPEAKER

(75) Inventors: Yasushi Iimori, Kariya (JP); Yoshiharu Kumura, Kariya (JP); Motoaki Suzukawa, Tokyo (JP); Yasuo Higashidate, Tokyo (JP); Hirofumi Onohara, Akishima (JP)

(73) Assignees: Kabushiki Kaisha Toyota Jidoshokki, Aichi-Ken (JP); Frey Co., Ltd., Tokyo (JP); Foster Electric Company, Limited, Tokyo (JP)

( * ) Notice: Subject to any disclaimer, the term of this patent is extended or adjusted under 35 U.S.C. 154(b) by 655 days.

(21) Appl. No.: 12/342,726

(22) Filed: Dec. 23, 2008

(65) Prior Publication Data

US 2009/0169031 A1 Jul. 2, 2009

(30) Foreign Application Priority Data

Dec. 25, 2007 (JP) ................. 2007-333053

(51) Int. Cl.
*H04B 1/00* (2006.01)
(52) U.S. Cl. ......................................................... 381/86
(58) Field of Classification Search .................... 381/86, 381/335, 302, 152, 389, 190, 423, 431
See application file for complete search history.

(56) References Cited

U.S. PATENT DOCUMENTS

| 4,204,096 A * | 5/1980 | Barcus et al. ................. 381/348 |
| 2002/0067841 A1 | 6/2002 | Bank et al. ..................... 381/152 |
| 2003/0118206 A1 * | 6/2003 | Damerow et al. ............. 381/389 |
| 2005/0100174 A1 * | 5/2005 | Howard et al. ................. 381/86 |
| 2006/0034467 A1 * | 2/2006 | Sleboda et al. ................. 381/86 |
| 2007/0030985 A1 * | 2/2007 | Cheung ......................... 381/152 |
| 2008/0123870 A1 * | 5/2008 | Stark et al. ..................... 381/86 |
| 2009/0226003 A1 * | 9/2009 | Blakey ............................ 381/86 |

FOREIGN PATENT DOCUMENTS

JP 2005-277471 10/2005

* cited by examiner

*Primary Examiner* — Dao H Nguyen
*Assistant Examiner* — Tram H Nguyen
(74) *Attorney, Agent, or Firm* — Locke Lord LLP

(57) ABSTRACT

A vehicle speaker including a panel, a giant magnetostrictive vibrator, and a vibration transmission pad. The panel is used as a diaphragm for producing high-frequency sound and forms part of a vehicle. The giant magnetostrictive vibrator is used as a vibration exciter for the panel and includes a vibration output shaft that vibrates in accordance with a signal for producing high-frequency sound. The vibration transmission pad is fixed to the panel and connected to the vibration output shaft in a manner enabling vibration transmission. The vibration transmission pad vibrates the panel when the vibration output shaft vibrates.

7 Claims, 5 Drawing Sheets

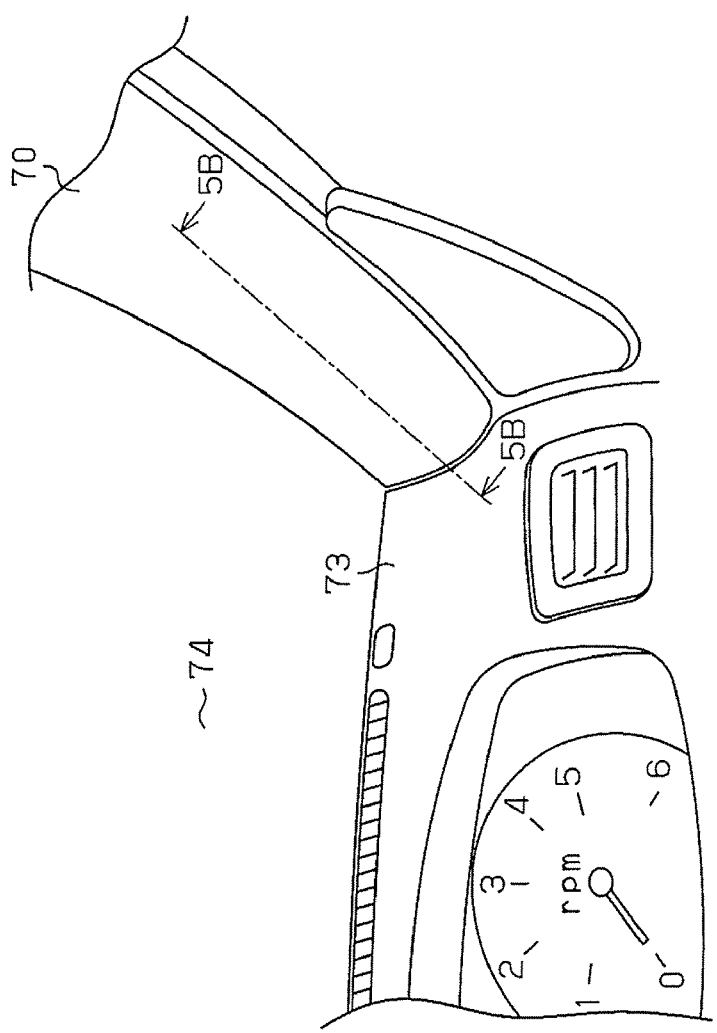
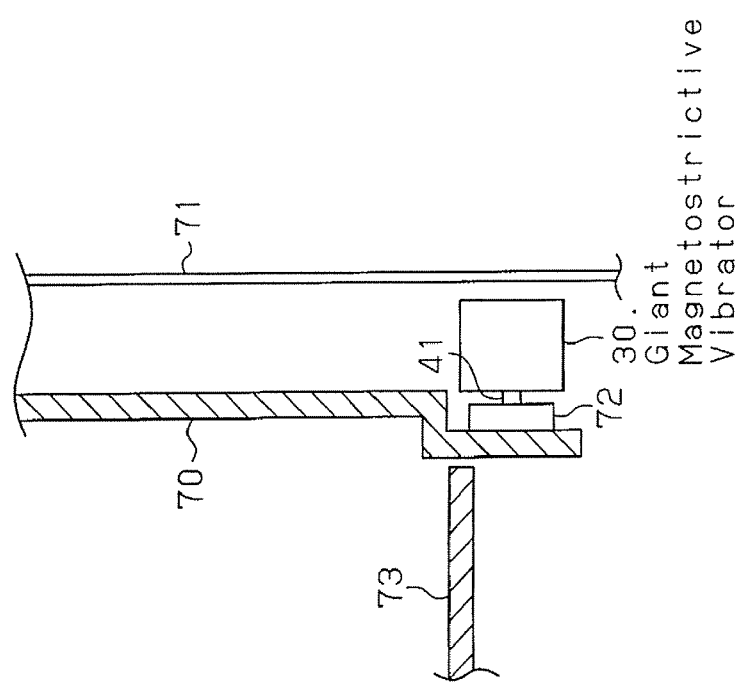

VEHICLE SPEAKER

BACKGROUND OF THE INVENTION

The present invention relates to a vehicle speaker.

Vehicle speakers of various structures and layouts are available. In one example of a speaker layout, a full range speaker is arranged at the lower part of a door, and a high-frequency speaker (tweeter) is arranged at the base of a front pillar. Japanese Laid-Open Patent Publication No. 2005-277471 describes a speaker using a giant magnetostrictive material to vibrate a floor or road.

In an automobile, a high-frequency sound of, for example, 1 kHz or higher, is apt to being affected by the position of a seat or the height of a vehicle occupant. Thus, in the prior art, a high-frequency sound is heard differently by a vehicle occupant depending on the seat position, the height of the vehicle occupant, or the like. Such difference in how a high-frequency sound is heard is caused by factors (a) and (b), which are listed below.

(a) High-frequency sound has a strong linear propagation property, and a high-frequency sound speaker has a high directivity property.

(b) The vehicle includes obstacles, such as seats, passengers other than the driver, and glass windows, which easily reflect sound. Due to the interference, reflection, and absorption of sound in the passenger compartment, sound may be heard as being loud in one region and soft in another region.

More speakers widen the area reached by high-frequency sound in comparison with when there are fewer speakers. However, due to the properties of a high-frequency speaker, which is mentioned above in factor (a), improvements cannot be made to how high-frequency sound is heard from each seat. In addition, the use of more speakers would cause sound interference (phase interference) that leads to the distortion of sound.

Further, when using speakers of the prior art, a sound image is fixed at a low position. It is preferred that a sound image be fixed at a position located slightly above the dashboard. The position at which a sound image is fixed refers to a position perceived by an occupant as, for example, where an instrument is being played. However, when using speakers of the prior art, it would be difficult to fix the sound image at a high position. In other words, it would be difficult to raise the acoustic field. The difficulty in raising the acoustic field is due to factors (c) and (d).

(c) A full-range speaker, which has a broad directivity, cannot be installed at a high position in the passenger compartment due to the structure of the vehicle.

(d) Due to the properties of a high-frequency speaker, the directivity of sound is high.

To raise the acoustic field, a speaker system may include a plurality of high-frequency sound speakers arranged from near the middle of an A-pillar to near an assist grip for a rear seat. Alternatively, a speaker may use part of a head lining as a diaphragm. However, due to the above-mentioned factor (d) and the factor in that the distance from the speaker to the ears of a vehicle occupant is too short, such structures would not be able to sufficiently raise the acoustic field.

SUMMARY OF THE INVENTION

The present invention provides a vehicle speaker that enables the acoustic field to be raised to a high position while enabling high-frequency sound to be heard in the same satisfactory manner from any seat.

One aspect of the present invention is a vehicle speaker including a panel forming part of a vehicle and used as a diaphragm for producing high-frequency sound. A giant magnetostrictive vibrator is used as a vibration exciter for the panel. The giant magnetostrictive vibrator includes a vibration output shaft which vibrates in accordance with a signal for producing high-frequency sound. A vibration transmission pad is fixed to the panel and connected to the vibration output shaft in a manner enabling vibration transmission. The vibration transmission pad vibrates the panel when the vibration output shaft vibrates.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5A is a perspective view showing part of a vehicle compartment in another example; and FIG. 5B is a cross-sectional view taken along line 5B-5B in FIG. 5A.

DETAILED DESCRIPTION OF THE PREFERRED EMBODIMENTS

A preferred embodiment of the present invention will now be discussed with reference to the drawings.

Figure 1:
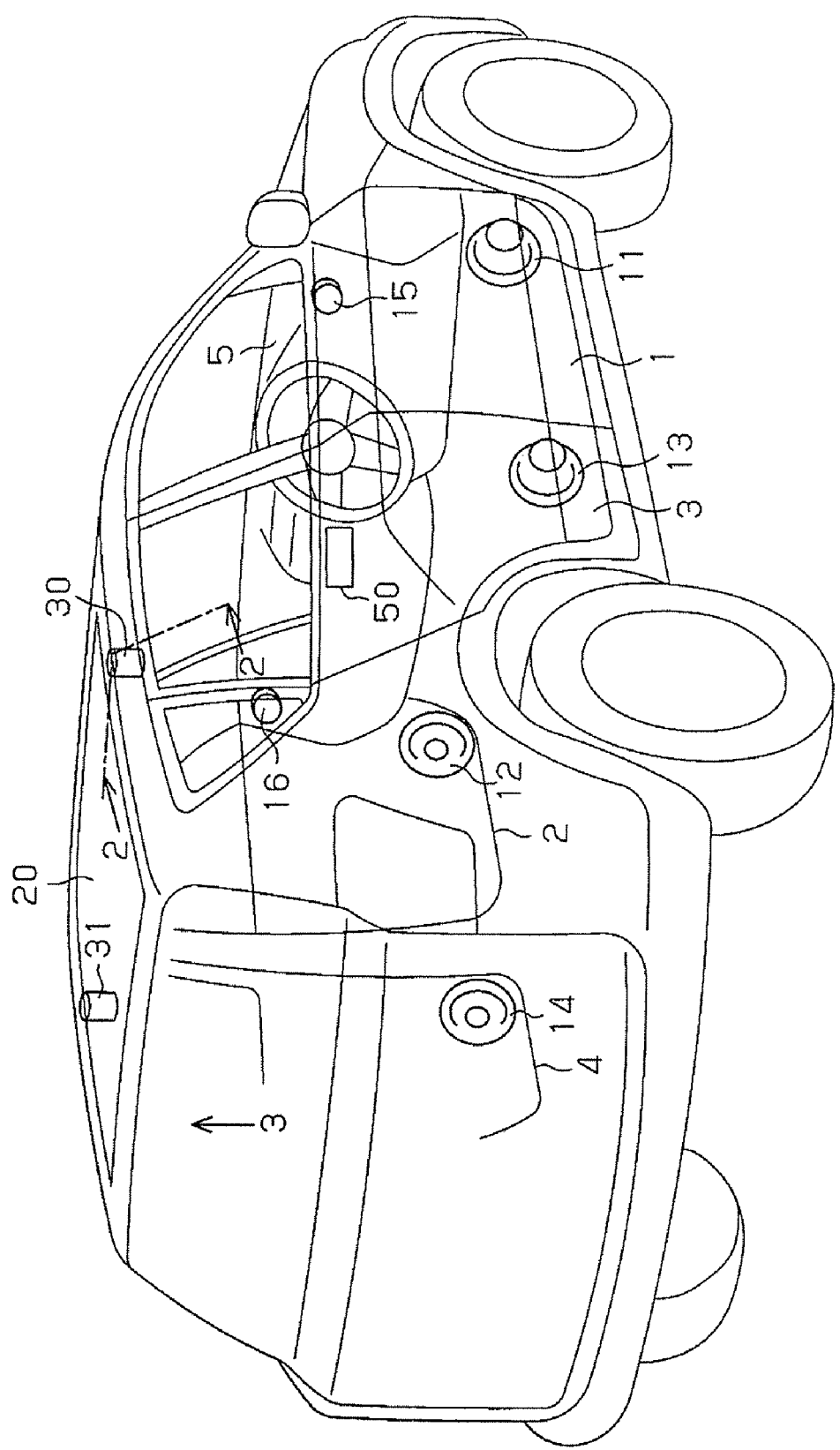
FIG. 1 is a perspective view showing the layout of speakers in an automobile audio apparatus according to a preferred embodiment of the present invention.

FIG. 1 shows the layout of speakers in an automobile audio apparatus. In the perspective view of FIG. 1, a right front door 1 has a lower portion in which a right front speaker 11 is installed. The speaker 11 is a full-range cone speaker. In the same manner, a left front door 2 has a lower portion in which a left front speaker 12 is installed. A right rear door 3 has a lower portion in which a right rear speaker 13 is installed. A left rear door 4 has a lower portion in which a left rear speaker 14 is installed. Each of the speakers 12, 13, and 14 are also full-range cone speakers. A dashboard 5 has a right side in which a high-frequency cone speaker 15 (tweeter) is installed and a left side in which a high-frequency cone speaker 16 (tweeter) is installed.

Further, a transparent roof panel 20 is fitted to the roof of the automobile. In the preferred embodiment, for example, a translucent resin panel having a low light transmittance is used. A vehicle occupant may look up from the passenger compartment to see the outside through the roof panel 20. A head unit 50 is arranged in the central portion of the dashboard 5. The head unit 50 outputs audio reproduction signals from a compact disc (CD) or the like.

Figure 2:
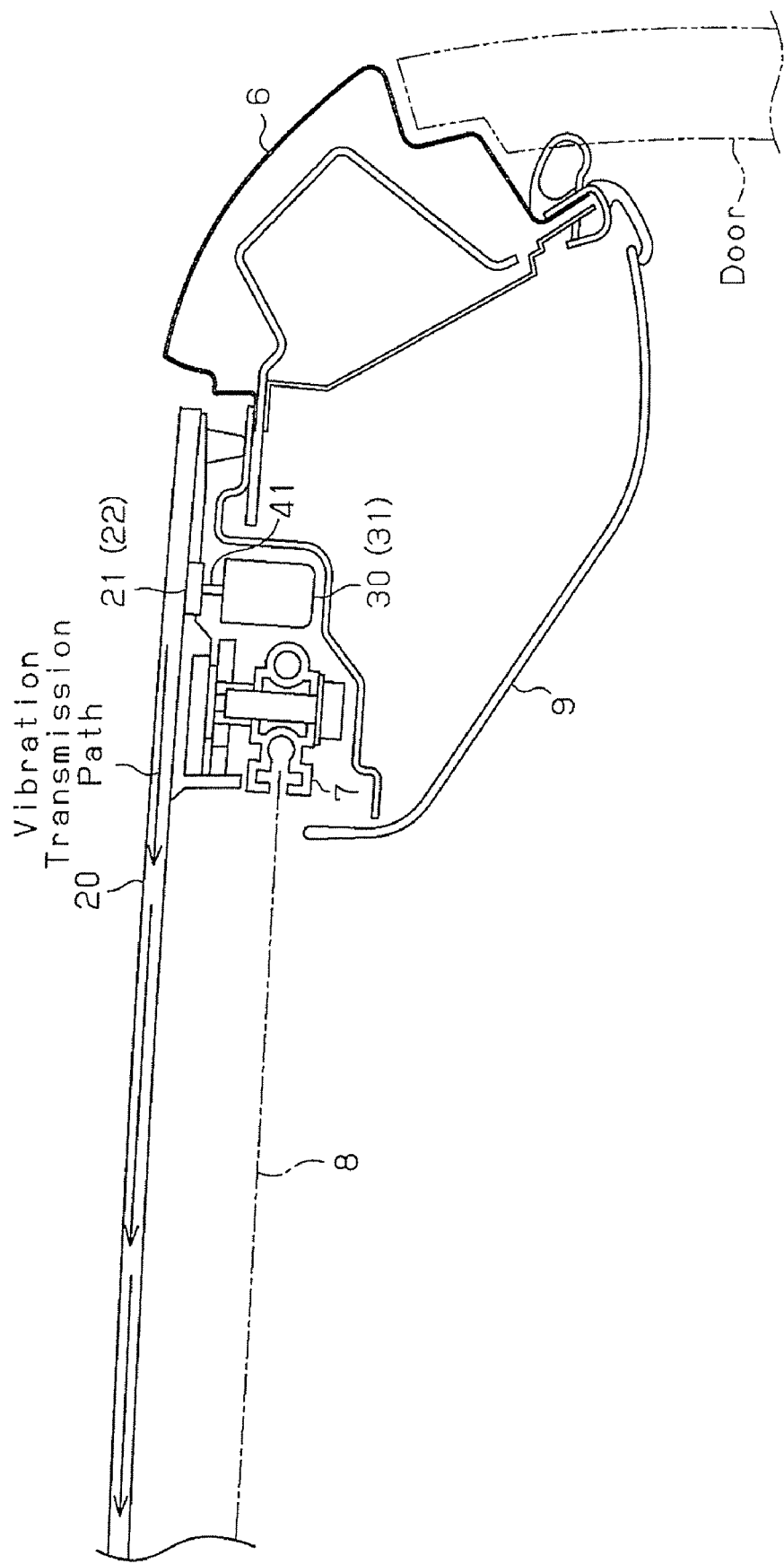
FIG. 2 is a cross-sectional view taken along line 2-2 in FIG. 1.
Figure 3:
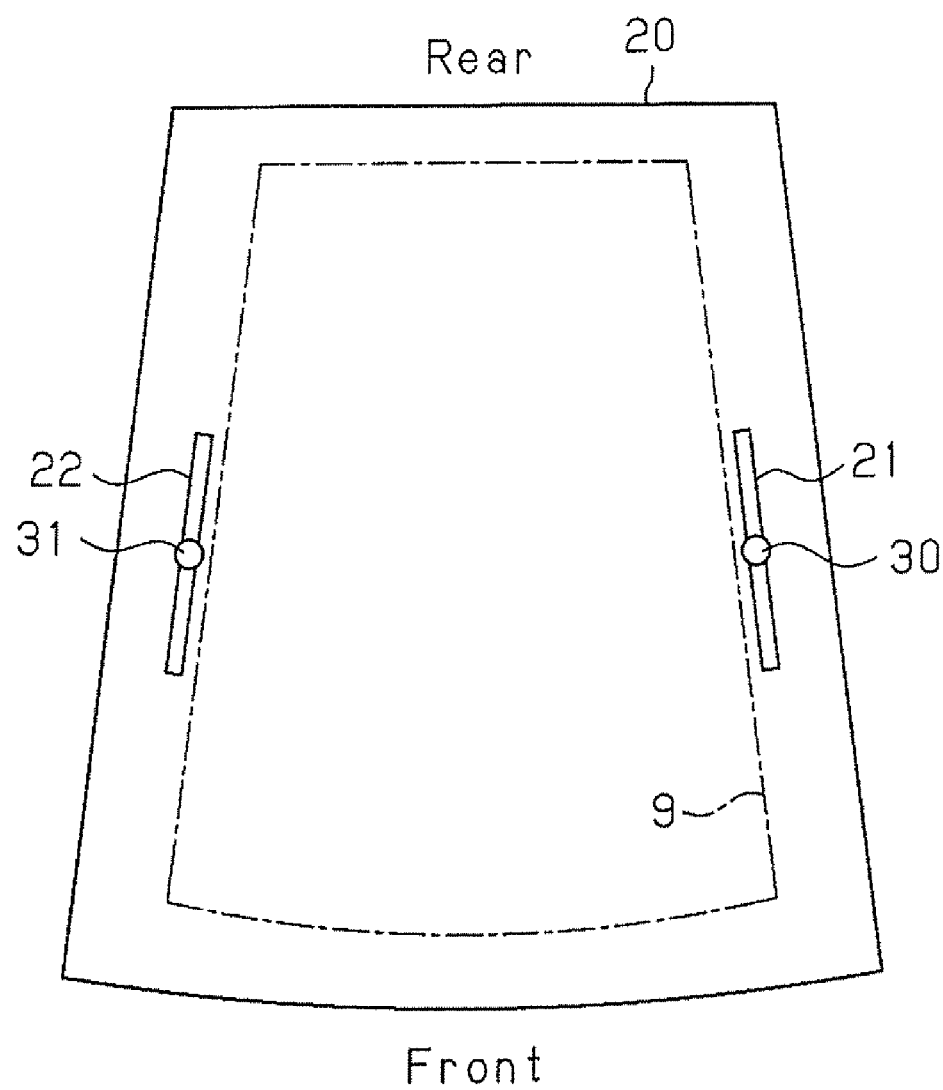
FIG. 3 is a bottom view showing a roof panel in the direction of arrow 3 in FIG. 1.

FIG. 2 is a cross-sectional view taken along line 2-2 in FIG. 1. FIG. 3 is a bottom view showing the roof in the direction of arrow 3 in FIG. 1, that is, the roof as seen when looking up from the passenger compartment.

FIG. 2 shows one of left and right side members 6. The roof panel 20 is arranged between the left and right side members 6. Further, the roof panel 20 is formed from polycarbonate or acrylic resin.

As viewed in FIG. 2, the roof panel 20 has a lower surface on which a holding mechanism 7 is arranged to hold a shade 8 so that the shade 8 is movable toward the front and rear of the vehicle. The holding mechanism 7 guides the shade 8 when moving the shade 8 to open or close the roof panel 20. The holding mechanism 7 is arranged on each of the lateral sides, or left and right sides, of the roof panel 20. The holding mechanism 7 is covered by an interior trim 9 and concealed from the occupants. Referring to FIG. 3, in the roof of the vehicle, the roof panel 20 has a peripheral portion covered by the interior trim 9.

Referring to FIG. 2, vibration transmission pads 21 and 22 are adhered to the lower surface of the resin roof panel 20 outward in the lateral direction from the corresponding holding mechanism 7. More specifically, as viewed in FIG. 3, the vibration transmission pad 21 is located near the right edge of the tetragonal resin roof panel 20 and concealed by the interior trim 9. In the same manner, the vibration transmission pad 22 is located near the left edge of the tetragonal resin roof panel 20 and concealed by the interior trim 9. The vibration transmission pads 21 and 22 extend in a direction perpendicular to the lateral direction of the vehicle. The vibration transmission pads 21 and 22 are each formed by an elongated plate of aluminum or brass. The pads 21 and 22 each have a length that is equal to approximately one-third the length of a roof opening. The "opening" refers to the region in which the outside can be seen through the roof panel 20 from the passenger compartment.

As shown in FIG. 2, a giant magnetostrictive vibrator 30 is arranged under the vibration transmission pad 21 in the passenger compartment. In the same manner, a giant magnetostrictive vibrator 31 is arranged under the vibration transmission pad 22 in the passenger compartment. Referring to FIG. 3, the giant magnetostrictive vibrators 30 and 31 are arranged at the longitudinally central portion of the pads 21 and 22. Further, the giant magnetostrictive vibrators 30 and 31 are also concealed by the interior trim 9 and cannot be seen from the occupants.

Referring to FIG. 2, a vibration output shaft 41 is connected to each of the giant magnetostrictive vibrators 30 and 31. The vibration output shaft 41 is vibrated in accordance with high-frequency reproduction signals. The vibration output shaft 41 has a distal end connected to the corresponding one of the vibration transmission pads 21 and 22 so as to enable vibration transmission. When the giant magnetostrictive vibrators 30 and 31 are driven, the vibration output shafts 41 are vibrated. Vibration of the vibration output shafts 41 vibrates the vibration transmission pads 21 and 22. Vibration of the vibration transmission pads 21 and 22 vibrates the roof panel 20. In other words, the roof panel 20 is used as a diaphragm for producing high-frequency sound. Further, the giant magnetostrictive vibrators 30 and 31 are used as vibration exciters for the diaphragm. Vibration is first transmitted from the giant magnetostrictive vibrators 30 and 31 to the vibration transmission pads 21 and 22 and then transmitted to the diaphragm.

The giant magnetostrictive vibrators 30 and 31 enable the generation of a large strain while enabling quick response and thereby satisfy two contradicting conditions. Accordingly, the giant magnetostrictive vibrators 30 and 31 are optimal when using a panel that has a large area and large mass, such as the roof panel 20, as a diaphragm for producing high-frequency sound. Further, by forming the vibration transmission pads 21 and 22 from aluminum or brass, the velocity of sound increases and vibration attenuation occurs at an adequate level. This prevents resonance, which produces annoying noise.

Figure 4:
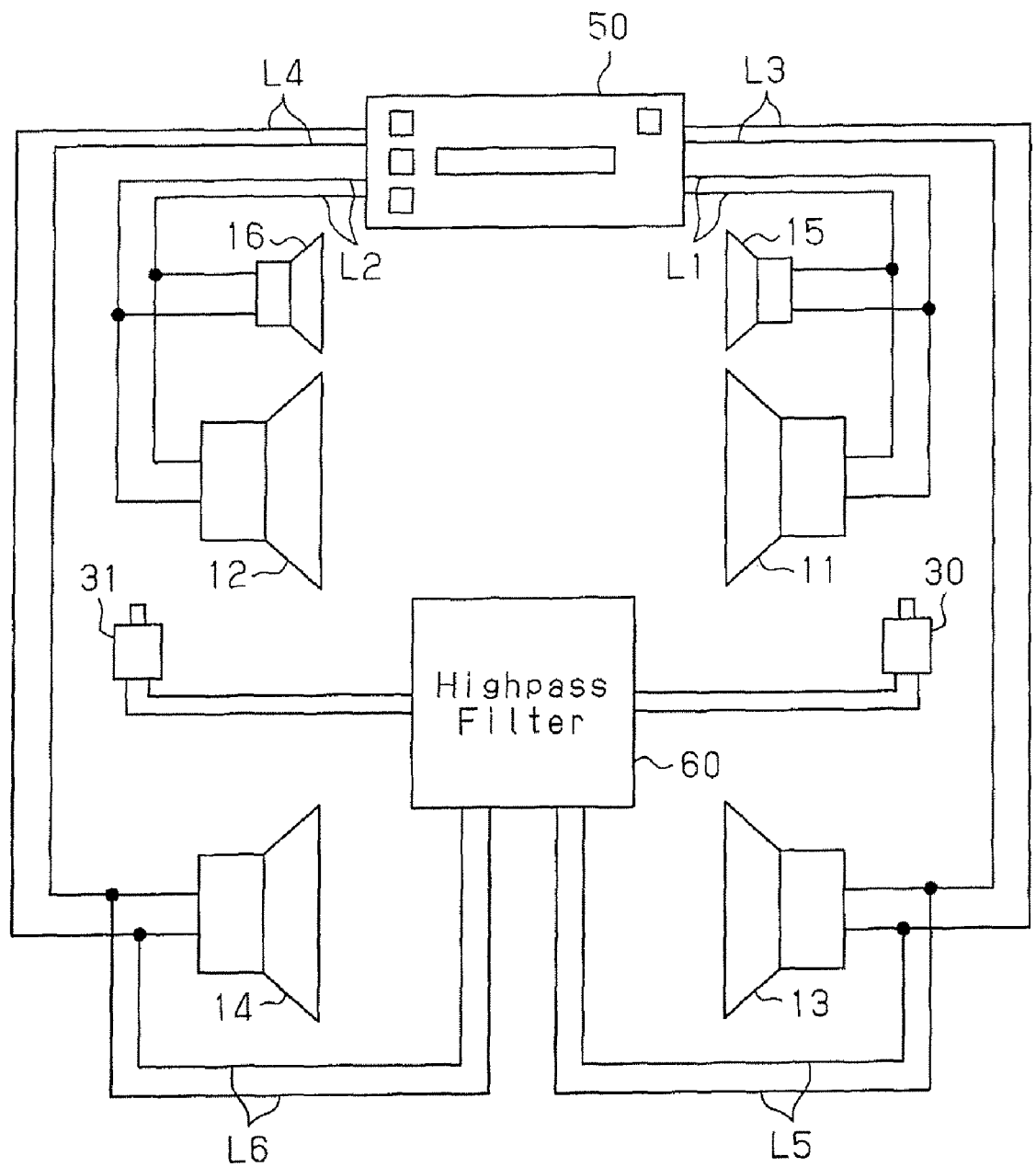
FIG. 4 is an electrical diagram of the audio apparatus shown in FIG. 1.

The electric structure of the audio apparatus in the preferred embodiment will now be discussed with reference to FIG. 4.

The head unit 50 is connected to the speakers 11, 12, 13, and 14. The head unit 50 is also connected to the high-frequency speakers 15 and 16. Further, the head unit 50 is connected to the giant magnetostrictive vibrators 30 and 31 via a highpass filter 60.

In detail, the head unit 50 is connected to the speakers 11 and 15 by signal lines L1. In the same manner, the head unit 50 is connected to the speakers 12 and 16 by signal lines L2. Further, the head unit 50 is connected to the speaker 13 by signal lines L3. In the same manner, the head unit 50 is connected to the speaker 14 by signal lines L4. Signal lines L5, which are branched from the signal lines L3, and signal lines L6, which are branched from the signal lines L4, are connected to the highpass filter 60. Accordingly, the signal lines L3 and L5 connect the giant magnetostrictive vibrator 30 to the head unit 50 via the highpass filter 60. In the same manner, the signal lines L4 and L6 connect the giant magnetostrictive vibrator 31 to the head unit 50 via the highpass filter 60.

The operational principle of the automobile speaker in the present embodiment will now be discussed.

The head unit 50 sends audio signals to each of the speakers 11, 15, 12, 16, 13, and 14. The right speakers 11, 13, and 15 are provided with right channel audio signals, and the left speakers 12, 14, and 16 are provided with left channel audio signals. The audio signals sent to the rear speakers 13 and 14 are also input to the highpass filter 60, which blocks low-frequency signals. The blocking of low-frequency signals results in high-frequency reproduction signals (high-frequency signals) being input to the giant magnetostrictive vibrators 30 and 31.

This vibrates the vibration output shaft 41 of each of the giant magnetostrictive vibrators 30 and 31. The vibration is transmitted to each of the vibration transmission pads 21 and 22. This enlarges the area in which vibration is transmittable. Furthermore, the vibration of the vibration transmission pads 21 and 22 vibrates the roof panel 20. In detail, referring to FIG. 2, vibration is first transmitted from the giant magnetostrictive vibrators 30 and 31 to the vibration transmission pads 21 and 22 and then transmitted to the roof panel 20. Vibration of the roof panel 20 vibrates air, and the vibration of air is audible as "sound" to the vehicle occupants. In this state, the vehicle occupants hear sound (e.g., music) from the entire roof panel 20.

As described above, in the present embodiment, the giant magnetostrictive vibrators 30 and 31, which enable the generation of a large strain while enabling quick response to electric signals, are used as vibration exciters for the roof panel 20, which is a diaphragm having a large area and large mass. Thus, the entire roof panel 20 has a quick response, or responds instantaneously. Further, vibration is first transmitted from the giant magnetostrictive vibrators 30 and 31 to the vibration transmission pads 21 and 22 and subsequently transmitted to the roof panel 20. This ensures that the vibration is transmitted. As a result, the roof panel 20 is used as a diaphragm for producing high-frequency sound. This raises the acoustic field and enables high-frequency sound to be heard in the same manner from any seat.

More specifically, in the passenger compartment of an automobile, the distance to the roof panel 20 is substantially the same for each seating position of the vehicle occupants. Further, there are no obstacles between the roof panel 20 and the ears of each vehicle occupant. Accordingly, the roof panel 20 is entirely used as a high-frequency diaphragm. This enables high-frequency sound, which has a tendency of being heard differently depending on the seated position of a vehicle occupant, to be heard in the same manner from any seat.

Other types of vibrators may be used in lieu of the giant magnetostrictive vibrators 30 and 31. For example, an electromagnetic vibrator, which is formed by combining a coil and a magnet, or a piezoelectric vibrator, which is formed by adhering a thin metal plate to piezoelectric material, may be used. However, such vibrators would not be able to satisfy certain requirements, such as the generated strain, response speed, size enabling installation in a vehicle, and operational voltage. In such a case, the roof panel 20, which has a large area and large mass, cannot be entirely driven at high speeds and thus would not be able to accurately reproduce audio signals.

If the giant magnetostrictive vibrators 30 and 31, which generate a large stress and have quick response, receive audio signals of full-band frequencies, this would heat the coil incorporated in each of the giant magnetostrictive vibrators 30 and 31. As a result, this may lower the performance of the giant magnetostrictive vibrators 30 and 31 or inflict damages to the giant magnetostrictive vibrators 30 and 31. However, the highpass filter 60 shown in FIG. 4 is used to block low-frequency signals, which are the main factor of the heating. This prevents such low-frequency signals from being input to the giant magnetostrictive vibrators 30 and 31. Thus, the heating of the coils is prevented.

When the highpass filter 60 attenuates audio signals at an attenuation curve (attenuation gradient) of −12 dB/oct, it is preferred that the cutoff frequency fc be set to a suitable value that is approximately 1 kHz or greater. It is further preferred that the giant magnetostrictive vibrators 30 and 31 receive high-frequency signals that are obtained by blocking audio signals of approximately 3 kHz to 5 kHz or less.

The preferred embodiment has the advantages described below.

(1) In the preferred embodiment, the automobile speaker apparatus includes the roof panel 20, which functions as a diaphragm for producing high-frequency sound, the giant magnetostrictive vibrators 30 and 31, which have the vibration output shafts 41, and the vibration transmission pads 21 and 22, which transmit the vibration of the vibration output shafts 41 to the roof panel 20. Thus, the automobile speaker apparatus raises the acoustic field and enables high-frequency sound to be heard to the vehicle occupant in the same satisfactory manner from any seat.

The above advantage will now be described in detail.

The automobile speaker apparatus eliminates differences between seats in how a high-frequency sound is heard.

The automobile speaker apparatus raises the acoustic field.

The automobile speaker apparatus increases the realistic level of the produced sound.

The automobile speaker apparatus enables a sound source to be installed at a location where it was difficult to install a cone speaker in the prior art.

The automobile speaker apparatus does not occupy much space in the passenger compartment.

The automobile speaker apparatus can eliminate conventional speakers (e.g., tweeters) and thereby reduce costs.

(2) The highpass filter 60 is arranged in a signal transmission path leading to the giant magnetostrictive vibrators 30 and 31, which function as vibration exciters. The highpass filter 60 blocks low-frequency signals, which are the main factor in heating, and passes the other audio signals to the giant magnetostrictive vibrators. This prevents the heating of the coils in the giant magnetostrictive vibrators 30 and 31 and thus prevents damage from being inflicted to the giant magnetostrictive vibrators 30 and 31. Furthermore, since low-frequency sound is blocked, the cohesion of the sound produced by the giant magnetostrictive vibrators 30 and 31 and the sound produced by the other speakers (i.e., door speakers and tweeters) is improved. This forms an excellent acoustic space in the passenger compartment.

(3) From the viewpoint of actual application, it is preferred that the roof panel 20 be formed from polycarbonate or acrylic resin.

It should be apparent to those skilled in the art that the present invention may be embodied in many other specific forms without departing from the spirit or scope of the invention. Particularly, it should be understood that the present invention may be embodied in the following forms.

Instead of a resin roof panel, an inorganic glass roof (tempered glass or laminated glass) may be used. When using an inorganic glass panel, due to the difference in the solid-state properties, compared to when using a resin roof panel, sound would become slightly smaller and the tone and directivity would change. In such a case, tuning may be performed taking into consideration such differences in the solid-state properties.

The vibration transmission pads 21 and 22 may be formed from steel, titanium, or magnesium. Alternatively, the vibration transmission pads 21 and 22 may be formed from an alloy including metals, such as aluminum, copper, zinc, iron, titanium, and magnesium. It is only required that the vibration transmission pads 21 and 22 be formed from a material that allows sound to travel at a high velocity, has a suitable vibration attenuation property, and does not generate resonance that produces annoying noise.

In the preferred embodiment, the quantity and layout of the vibration transmission pads and giant magnetostrictive vibrators are set as shown in FIG. 3. More specifically, the vibration transmission pads 21 and 22 are respectively arranged near the left and right edges of the tetragonal resin roof panel 20, and the giant magnetostrictive vibrators 30 and 31 are arranged in correspondence with the vibration transmission pads 21 and 22. However, the present invention is not limited in such a manner. For example, vibration transmission pads may be arranged near the front and rear edges of the resin roof panel 20. Alternatively, a vibration transmission pad may be arranged near only one of the right, left, front, and rear edges of the resin roof panel 20. That is, a single vibration transmission pad and a single giant magnetostrictive vibrator may be arranged at one of these positions. As another option, a single vibration transmission pad and a single giant magnetostrictive vibrator may be arranged at the central part of the roof panel 20.

In the preferred embodiment, the roof panel is used as a diaphragm. However, the present invention is not limited in such a manner. For example, a window other than the roof panel, such as a quarter window, or a hard ornamental interior material, such as a front pillar garnish 70 (refer to FIGS. 5A and 5B), may be used as a diaphragm. In other words, a panel forming any part of a vehicle, preferably, a panel located upward from at least the dashboard of the vehicle, may be used as a diaphragm that produces high-frequency sound. FIGS. 5A and 5B show a vehicle body steel plate 71, a vibration pad 72, a dashboard 73, and a front windshield glass 74.

The present examples and embodiments are to be considered as illustrative and not restrictive, and the invention is not to be limited to the details given herein, but may be modified within the scope and equivalence of the appended claims.

What is claimed is:

1. A vehicle speaker comprising:
   a panel forming part of a vehicle and used as a diaphragm for producing high-frequency sound;
   a giant magnetostrictive vibrator used as a vibration exciter for the panel,
   wherein the giant magnetostrictive vibrator includes a vibration output shaft which vibrates in accordance with a signal for producing high-frequency sound; and
   a vibration transmission pad fixed to the panel and connected to the vibration output shaft in a manner enabling vibration transmission, wherein the vibration transmission pad vibrates the panel when the vibration output shaft vibrates.

2. The vehicle speaker according to claim 1, wherein the panel is any panel located upward from at least a dashboard of the vehicle.

3. The vehicle speaker according to claim 2, wherein the panel is a window of the vehicle.

4. The vehicle speaker according to claim 3, wherein the window is a resin or glass roof panel.

5. The vehicle speaker according to claim 4, wherein the roof panel is formed from polycarbonate or an acrylic resin.

6. The vehicle speaker according to claim 4,
   wherein:
   the giant magnetostrictive vibrator is one of two giant magnetostrictive vibrators;
   the vibration transmission pad is one of two vibration transmission pads; and
   the roof panel includes a left side and a right side, with one of the giant magnetostrictive vibrators and one of the vibration transmission pads being arranged on the left side of the roof panel, and
   the other one of the giant magnetostrictive vibrators and the other one of the vibration transmission pads being arranged on the right side of the roof panel.

7. The vehicle speaker according to claim 1, further comprising: a signal transmission path connected to the giant magnetostrictive vibrator; and a highpass filter arranged in the signal transmission path.

* * * * *